United States Patent
Mason

(10) Patent No.: US 9,813,500 B2
(45) Date of Patent: Nov. 7, 2017

(54) ALLOCATING CLOUD STORAGE BASED ON STORAGE ATTRIBUTES

(71) Applicant: Cisco Technology, Inc., San Jose, CA (US)

(72) Inventor: Seth Mason, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 14/737,956

(22) Filed: Jun. 12, 2015

(65) Prior Publication Data

US 2016/0366223 A1  Dec. 15, 2016

(51) Int. Cl.

| G06F 15/173 | (2006.01) |
|---|---|
| H04L 29/08 | (2006.01) |
| H04L 12/911 | (2013.01) |
| H04L 12/24 | (2006.01) |
| G06F 9/50 | (2006.01) |

(52) U.S. Cl.
CPC ........ *H04L 67/1097* (2013.01); *G06F 9/5016* (2013.01); *G06F 9/5072* (2013.01); *H04L 41/0816* (2013.01); *H04L 47/70* (2013.01); *H04L 67/306* (2013.01)

(58) Field of Classification Search
USPC ................ 709/226, 202, 203, 201, 212, 216
See application file for complete search history.

(56) References Cited

U.S. PATENT DOCUMENTS

| 6,622,163 B1 | 9/2003 | Tawill et al. |
|---|---|---|
| 6,801,992 B2 | 10/2004 | Gajjar et al. |
| 7,325,120 B2 | 1/2008 | Sawdon et al. |
| 7,784,049 B1 | 8/2010 | Gandler |
| 7,934,056 B2 | 4/2011 | Sawdon et al. |
| 7,996,525 B2 | 8/2011 | Stienhans et al. |
| 8,190,740 B2 | 5/2012 | Stienhans et al. |
| 8,468,245 B2 | 6/2013 | Farber et al. |
| 8,655,997 B2 | 2/2014 | Eilam et al. |
| 8,762,480 B2 | 6/2014 | Park et al. |
| 8,799,322 B2 | 8/2014 | deMilo et al. |
| 8,850,528 B2 | 9/2014 | Van Biljon et al. |

(Continued)

FOREIGN PATENT DOCUMENTS

| WO | 2005081672 A2 | 9/2005 |
|---|---|---|
| WO | 2013119200 A1 | 8/2013 |
| WO | 2014/036307 A1 | 3/2014 |

OTHER PUBLICATIONS

International Search Report and Written Opinion in counterpart International Application PCT/US2016/035651, dated Sep. 9, 2016, 14 pages.

(Continued)

*Primary Examiner* — Lan-Dai T Truong
(74) *Attorney, Agent, or Firm* — Edell, Shapiro & Finnan, LLC

(57) ABSTRACT

A method of allocating cloud storage based on storage profiles includes receiving a storage request from a virtual machine associated with a tenant at a computing apparatus having connectivity to a network. The storage request is analyzed to determine one or more storage attributes of the storage request. An infrastructure is configured in a configuration based on the one or more storage attributes and data associated with the storage request is stored in the infrastructure in accordance with the configuration.

20 Claims, 4 Drawing Sheets

(56) References Cited

U.S. PATENT DOCUMENTS

| | | |
|---|---|---|
| 8,862,542 B2 | 10/2014 | Darcy |
| 8,918,439 B2 | 12/2014 | Alatorre et al. |
| 8,918,488 B2 | 12/2014 | Umbehocker et al. |
| 9,063,763 B2 * | 6/2015 | Astete ................. G06F 9/45533 |
| 2010/0235832 A1 | 9/2010 | Rajagopal et al. |
| 2011/0055378 A1 | 3/2011 | Ferris et al. |
| 2011/0145392 A1 | 6/2011 | Dawson et al. |
| 2011/0145818 A1 * | 6/2011 | Vemuri ................. G06F 3/0604 |
| | | 718/1 |
| 2011/0185147 A1 * | 7/2011 | Hatfield ................. G06F 3/061 |
| | | 711/170 |
| 2012/0254567 A1 | 10/2012 | Umbehocker |
| 2013/0297905 A1 | 11/2013 | Yang et al. |
| 2014/0025723 A1 | 1/2014 | Xu et al. |
| 2014/0068056 A1 | 3/2014 | Simitsis et al. |
| 2014/0244585 A1 * | 8/2014 | Sivasubramanian G06F 17/30289 |
| | | 707/639 |
| 2014/0351606 A1 | 11/2014 | DeMilo et al. |
| 2015/0032954 A1 | 1/2015 | Maheshwari et al. |
| 2015/0052518 A1 | 2/2015 | Sarisky et al. |
| 2016/0150003 A1 * | 5/2016 | Magdon-Ismail .. H04L 67/1097 |
| | | 709/223 |

OTHER PUBLICATIONS

Atlantis, "Atlantis USX™," Technology Overview, retrieved from http://www.atlantiscomputing.com/technology/overview, on Jun. 12, 2015, 2 pages.

Sun Microsystems, Inc., "Chapter 5, Configuring Basic Storage," Sun StorageTek Common Array Manager Software, Installation Guide, retrieved from https://docs.oracle.com/cd/E19259-01/820-5747-10/chapter5.html, on Jun. 12, 2015, 10 pages.

* cited by examiner

ALLOCATING CLOUD STORAGE BASED ON STORAGE ATTRIBUTES

TECHNICAL FIELD

The present disclosure relates to cloud computing services.

BACKGROUND

In a public or private cloud computing environment, block-based data storage is generally allocated to applications based on low level metrics including capacity of volumes to be stored (frequently measured in megabytes, gigabytes, and terabytes) and, more recently, the number of Input/Output Operations per Second ("IOPS") required by the volume. However, applications typically have more characteristics that can accurately describe the storage requirement. For example IOPS may be "read" or "write" operations of some size, and a storage requirement may depend on a read-write ratio. Similarly, a storage requirement may depend on whether the Input/Output ("IO") is sequential or random and the size of the IO (frequently measured in kilobytes). In order to attempt to satisfy these requirements, an application owner or virtual machine ("VM") administrator has to purchase or allocate a set of storage volumes with different capabilities and then assemble those different volumes into a pool of storage that an application can use to the best of its ability. If an application owner or VM administrator underprovisions, the application owner or VM administrator may be required to reprovision. Consequently, application owners and VM administrators frequently overprovision, using more resources than necessary in order to avoid having to reprovision.

DESCRIPTION OF EXAMPLE EMBODIMENTS

Overview

Techniques are provided herein for allocating cloud storage based on storage attributes. These techniques may be embodied as a method, a system, and instructions in a computer-readable storage media to perform the method. According to at least one example embodiment, a computing apparatus having connectivity to a network receives a storage request from a virtual machine associated with a tenant. The storage request is analyzed to determine one or more storage attributes of the storage request. An infrastructure is configured in a configuration based on the one or more storage attributes and data associated with the storage request is stored in the infrastructure in accordance with the configuration.

Example Embodiments

Presented herein are a system and methods for allocating cloud storage based on storage attributes and, in particular, for configuring cloud infrastructure based on storage attributes of data associated with a storage request. The storage configuration is dynamically optimized in view of the available infrastructure and the storage attributes, insofar as dynamically indicates that the storage configuration may be adjusted as the storage attributes and/or the infrastructure change. In other words, once the needs of a consuming endpoint are specified (either explicitly or as determined through analysis) a storage endpoint and any infrastructure associated with the storage endpoint may configure itself to appropriately service those needs. In some embodiments, a storage profile is created for each storage request. The storage profile may be based on a predetermined storage profile (e.g., a storage request resembling or associated with a database may initially be stored in a storage configuration that is optimal or beneficial for a workflow associated with a database), but the storage profile may be periodically updated in order to more accurately or optimally reflect the storage attributes of the workload associated with the storage request. Storing storage requests in this manner may enable cloud infrastructure to be optimized for a workload without requiring an application owner to assemble their own infrastructure, which frequently results in under or over provisioning. Consequently, storing storage requests in this manner may efficiently leverage cloud resources.

Figure 1:
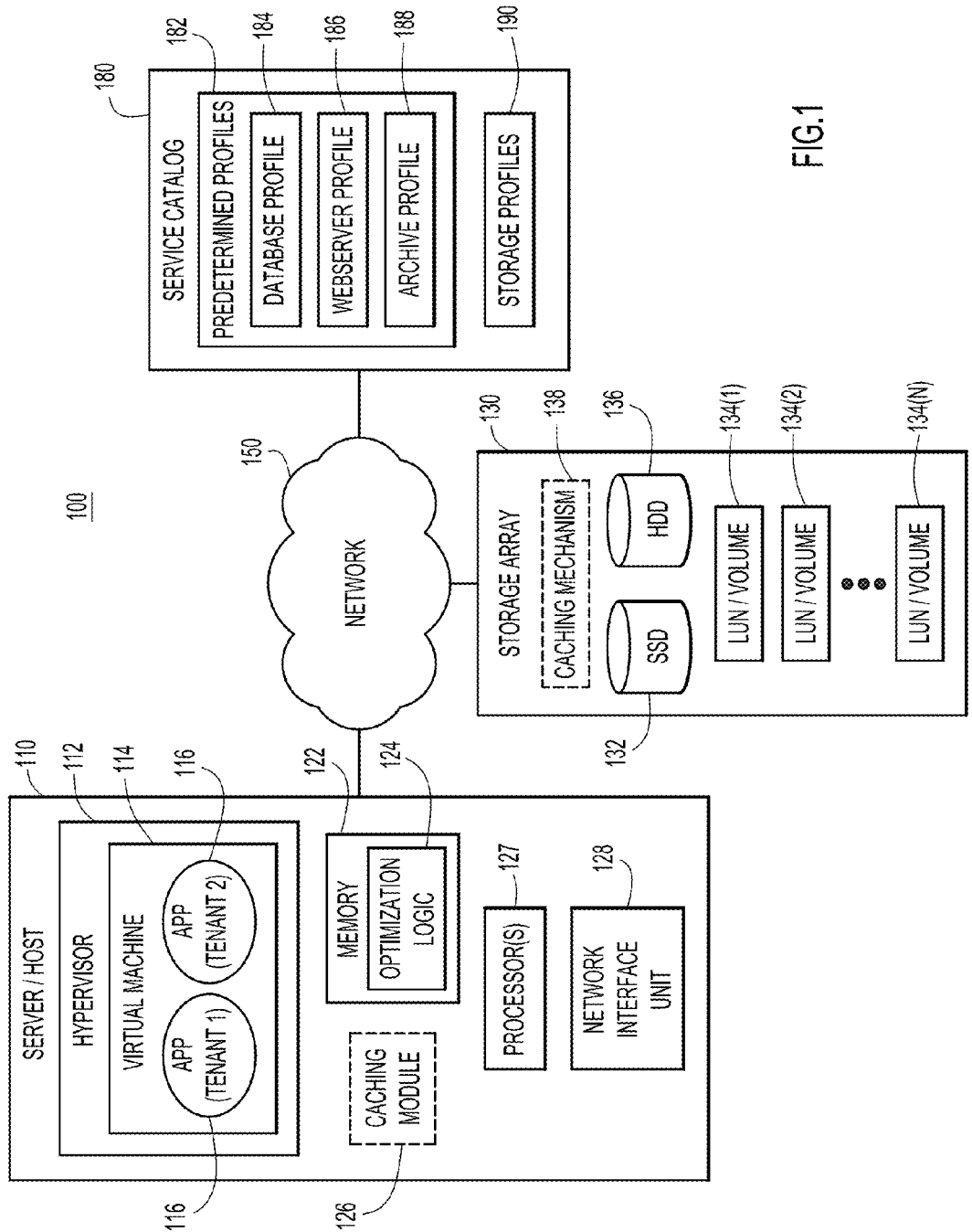
FIG. 1 is a block diagram of a cloud computing environment in which cloud storage may be allocated based on storage attributes, according to an example embodiment.

Reference is first made to FIG. 1. FIG. 1 illustrates a cloud computing system 100 according to an example embodiment. The system 100 includes a server/host 110, a storage array 130, and a service catalog 180. The server/host 110 includes a hypervisor 112 within which one more VMs 114 may run. For simplicity, FIG. 1 shows that there is a single virtual machine 114 that runs in the hypervisor 112. Within virtual machine 114 there is at least one application 116. Again, for simplicity, FIG. 1 shows a pair of applications 116 within the virtual machine 114. The virtual machine 114 is operated by at least one end user or administrator ("tenant"), such that at least one of the applications 116 is executed within the virtual machine 114 for each tenant. In the example embodiment shown in FIG. 1, a first application 116 is associated with a first tenant ("tenant 1") and a second application 116 is associated with a second tenant ("tenant 2"). In the example shown in FIG. 1, the applications 116 are the originator of IO requests.

It should be understood that host 110 operated by a Cloud Operator runs one or more tenant VMs on the hypervisor 112. The host 110 virtualizes and consolidates IO streams from multiple VMs into one or more IO streams which are transported over a network, e.g., programmable network 150. The programmable network 150 is, in one example, an Application Programming Interface (API)-configurable Ethernet/Internet Protocol (IP) network capable of creating and enforcing policies such as Quality of Service (QoS), and measuring network flows between a source and destination. The network 150 may also set or enforce different encryption settings if needed.

The host 110 may also include a caching module 126 and a memory 122 within which executable instructions for an optimization module 124 may be stored. Memory 122 may also provide a local storage cache in the form of solid state disk (SSD), hard disk drive (HDD), or Flash based PCI adapters, such as FusionIO. More generally, memory 122 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 122 may be or include one or more tangible (non-transitory) computer readable storage media (e.g., a memory device) encoded with software comprising computer executable instructions. For example, memory 122 may store instructions that may be executed by processor 127 for performing the storage attribute determination and infrastructure configuration described below with reference to FIGS. 2-4. The server/host 110 further includes a network interface unit 128 configured to enable network communications. In other words, memory 122 may include instructions, that when executed by one or more processors, cause the one or more processors to carry out the operations described below in connection with FIGS. 2-4.

The optimization module 124 may comprise executable instructions configured to measure and/or determine storage attributes of workloads running on the virtual machine 114 (e.g., IO streams originated by the applications 116). More specifically, the optimization module 124 may monitor the IOs originating from applications 116 to determine the IOPS, a read-write ratio, IO size, the ratio of sequential-to-random IOs, and/or the most frequently accessed storage blocks. The optimization module 124 may also include instructions to communicate with the application tenant and the service catalog 180 in order to provide feedback to the application tenant and service catalog 180 about monitored IO streams that may enable an application tenant 114 and the service catalog 180 to optimally configure any requisite cloud infrastructure (e.g., provide the necessary QoS, as determined by multiplying the IO size by IOPS, on the programmable network 150 or request an appropriate number of storage volumes in the storage array 130).

Still referring to FIG. 1, the storage array 130 includes a persistent storage medium (hard drives or solid state disk) and a high speed, low latency non-volatile (random access memory) caching mechanism. For simplicity, FIG. 1 shows storage array 130 includes SSD storage 132, a plurality of Logical Unit Numbers (LUNs)/Volumes 134(1)-134(N) and a HDD 136. The storage array 130 is capable of guaranteeing a minimum number of IOPS on a Volume/LUN basis. The storage array 130 may also be able to optimize for sequential and random IO workloads by fetching blocks ahead of the currently accessed ones from sequential workloads. In some embodiments, the storage array 130 may also include a caching mechanism 138, either in addition to or as alternative to caching module 126 in the server/host 110. Thus, the storage array 130 may be manipulated by the caching module 126 of the host/server 110 and/or by the caching mechanism 138.

For example, in some embodiments, the caching mechanism 138 acknowledges IO requests and stores data prior to be de-staged to long term storage in one or more of the LUN/Volumes 134(1)-134(N). The performance of the caching mechanism 138 is at least an order of magnitude faster than the LUN/Volumes 134(1)-134(N). The storage array 130 is capable of programmatically adjusting, via a Representational State Transfer (RESTful) API, the ratio and allotment of dynamic cache to long term storage, on a per volume, object, LUN or file system basis. Therefore it is possible to programmatically increase as well as decrease the amount of dynamic cache allocated to a given tenant.

Still referring to FIG. 1, the service catalog 180 is now further described. The service catalog 180 may include a number of predetermined profiles 182, such as a database profile 184, a webserver profile, and an archive profile 188. The service catalog 180 may also include storage profiles 190, which may be created and/or updated as needed. For example, in some embodiments, the optimization module 124 running on the server/host 110 may select one of the predetermined profiles 182 to represent a workflow and/or data associated with a storage request and update and/or adjust one of the predetermined profiles 182 in order to create a storage profile that may be stored in the storage profiles 190. Alternatively, a storage profile identical to a predetermined profile may be stored in the storage profiles 190 and associated with a specific storage request.

In a traditional IO flow, the VM 114 issues an IO (read/write command), which is in turn interpreted by the hypervisor 112 and converted into a network stream. The network stream is transported over the network 150 to the storage array 130. The storage array 130 receives the IO from the network 150, and executes the operation (reads data, or writes data) to/from its internal structures. If possible, the storage array 130 will service the operation to cache (for writes) or if the data is already in cache, from cache (for reads). If the data is not in cache (a "cache miss") then the storage infrastructure will read data from the long term storage.

Figure 2:
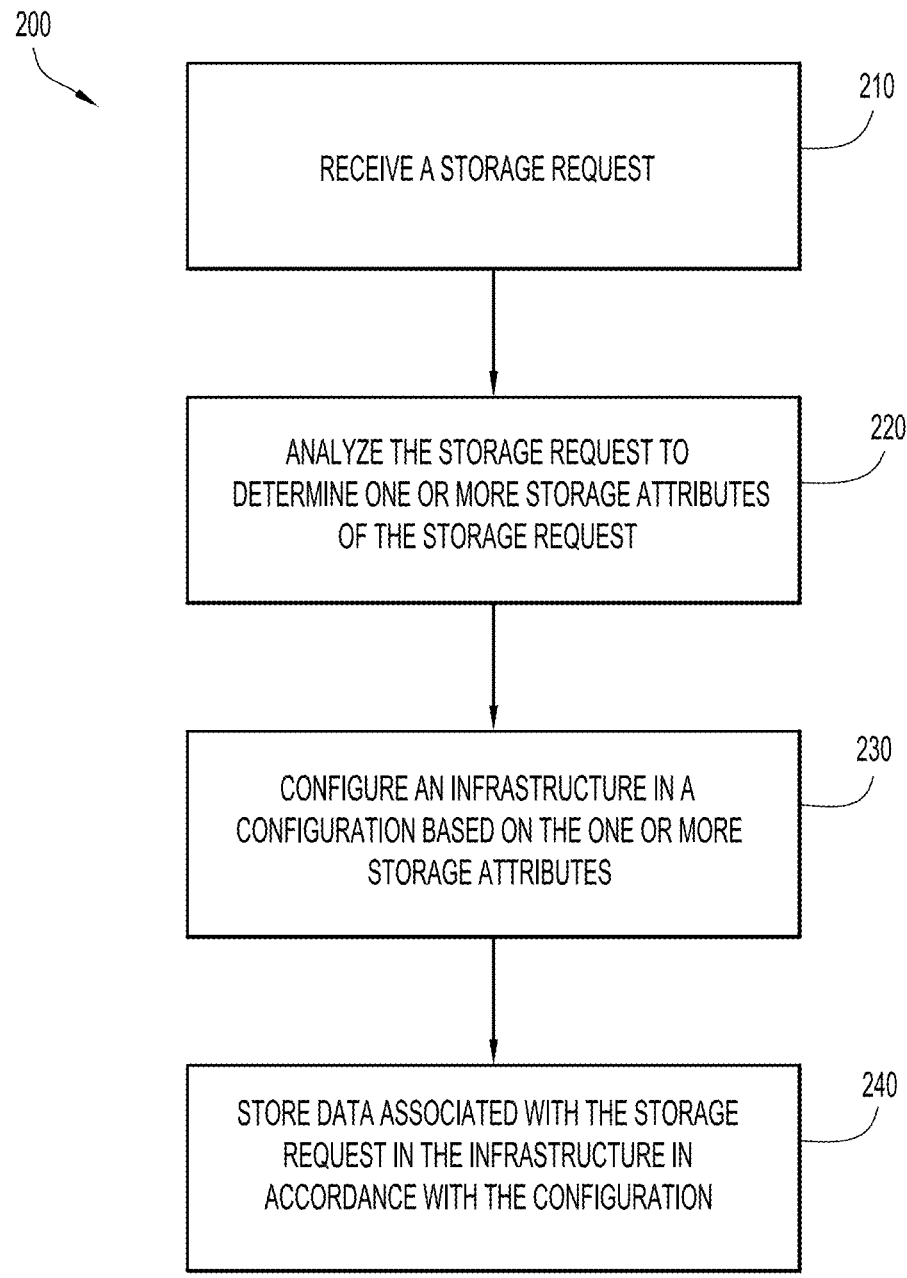
FIG. 2 is a high-level flowchart illustrating a process for allocating cloud storage based on storage attributes, according to an example embodiment.

Reference is now made to FIG. 2 for a high-level description of a method 200 for allocating cloud storage based on storage attributes, such as performed by execution of the software instructions of optimization module 124. At step 210, a storage request is received from a tenant. In some embodiments, the storage request may be a generic request based on a business need, such as a request for a "10 GB Database Volume," but in other embodiments, the storage request may include specific storage attributes.

When a storage request is received, the storage request is analyzed in order to determine one or more storage attributes of the storage request, at step 220. For example, if a tenant requests an archival volume, an analysis of this request and in particular, an analysis of the parameter "archival database" may reveal that storage capable of handling a large number of writes and very few reads is required. These requirements may be mapped to specific storage attributes, such as a read-write ratio. Alternatively, storage attributes may be determined by analyzing parameters included in the data of an IO stream associated with the storage request. For example, data included in an IO stream associated with the storage request can be analyzed to determine the size of the IO stream (typically in KB), the capacity (perhaps in GB), the read-write ratio of the IO stream, the sequential vs. random ratio of the IO stream, the IOPS, and/or the durability.

At step 230, cloud infrastructure can be configured in a configuration based on the one or more storage attributes. For example, in the infrastructure of FIG. 1, the service catalog 180 may communicate a number and type of volumes to provide in the storage array 130, communicate network requirements to the network 150 to ensure the volumes can be accessed (such as QoS or encryption), and communicate a host caching method to the host 110 (e.g., caching needs to be very aggressive on reads or needs to utilize write through caching). The storage configuration, network requirements, and host caching method may each be determined based on the storage attributes of the storage request. As a more specific example, if the IO stream associated with a storage request is representative of a database workload, the cloud infrastructure (e.g., the storage array 130, network 150, and host 110) may be configured in a configuration that is optimal for a database workload.

Once the infrastructure is configured, data associated with the storage request may be stored in the infrastructure in accordance with the configuration, at step 240. For example, in the environment illustrated in FIG. 1, a storage request may be cached within the server/host 110 and the network 150 and server/host 110 may work in conjunction with the array 130 to optimally meet requirements of a profile. Then, the storage array 130 and the network 150 will service storage requests. In some embodiments, data representing the analyzed parameters may also be stored in the infrastructure, but this data may be stored and associated with storage profiles. For example, in the computing environment illustrated in FIG. 1, data representing analyzed parameters may be stored in the service catalog 180 while data associated with the storage request is stored in the storage array 130 and/or host 110.

Figure 3:
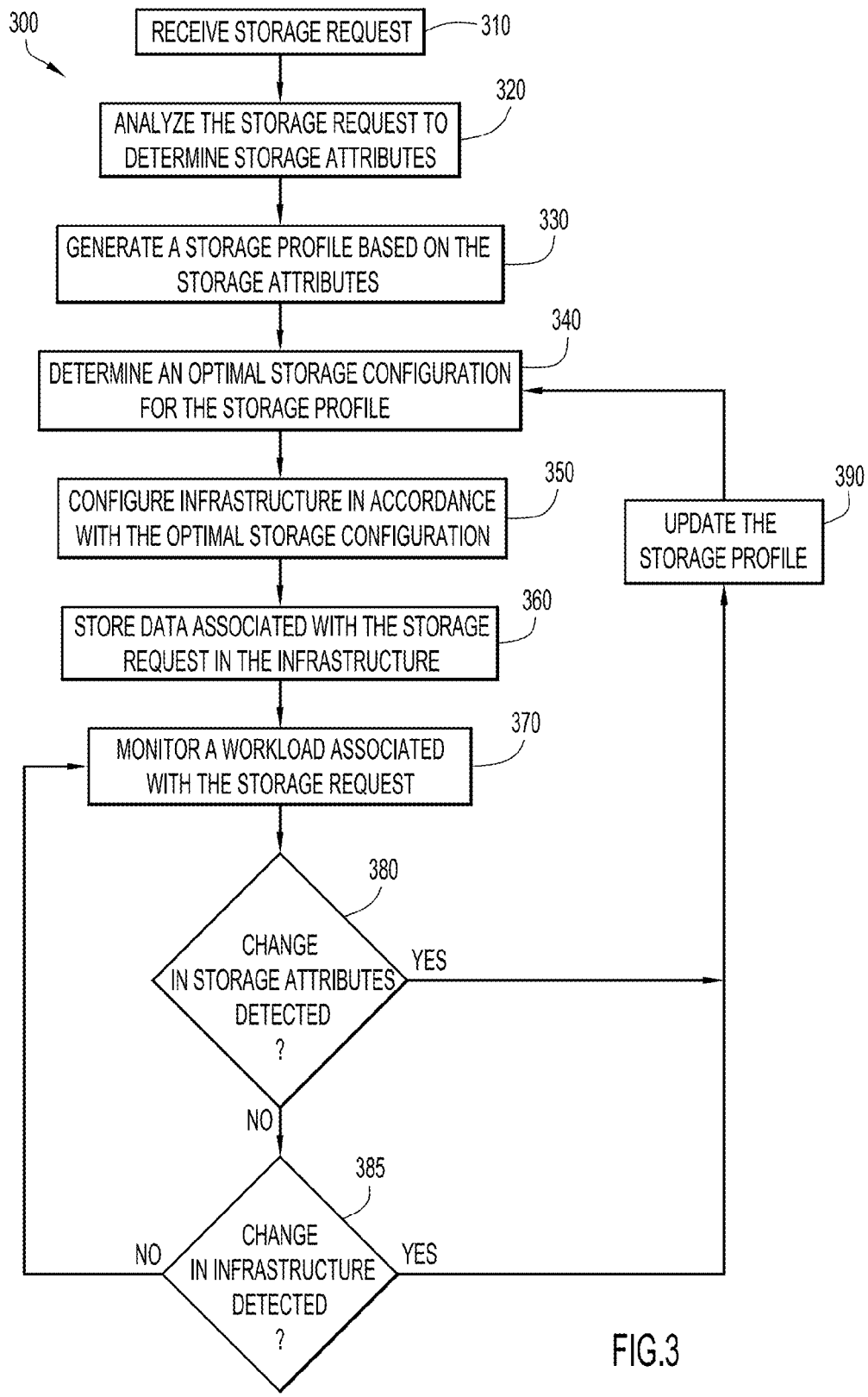
FIG. 3 is a flowchart illustrating a process for allocating cloud storage based on storage attributes, according to another example embodiment.

Referring now to FIG. 3, a flow chart depicting one example of a process 300 for allocating cloud storage based on storage attributes is shown. At steps 310 and 320, a storage request is received and analyzed to determine storage attributes in the same manner described above with respect to steps 210 and 220 in FIG. 2. At step 330, a storage profile is generated for the storage request based on the storage attributes that were determined at step 320. As mentioned, in some embodiments, the storage request may simply provide general terms or parameters, perhaps including certain keywords or indicators like database, webserver, archive, confidential, etc., that may be associated with specific storage attributes. In these embodiments, the storage profile may, at least initially, be generated based on the storage attributes associated with a predetermined profile associated with a parameter, keyword, and/or indicator. For example, upon receiving a storage request for a 10 GB Database Volume, a storage profile may be created based on a generic profile for databases (e.g., database profile 184) and may include the following storage attributes: a 8 KB IO size with 80% reads, 20% writes, 90% random IO; 5000 IOPS; and two copies of the data. However, in other embodiments, storage attributes could be explicitly requested or defined. For example, a 10 GB Database Volume with 5500 IOPS could be specifically requested resulting in a modification of the standard database profile to include 5500 IOPS instead of 5000 IOPS. In still other embodiments, a unique storage profile may be generated in response to a storage request without first determining attributes or properties of the storage request from descriptive keywords. In other words, a storage profile need not be created by modifying a predetermined profile and, instead, a storage profile may be created independently of any predetermined profiles, perhaps based on determined storage attributes of the data associated with the storage request.

At step 340, the optimal storage configuration for the storage profile may be determined. For example, if the storage profile requires a large number of writes, it may be determined that the storage array 130 should provide mostly SSD storage.

At step 350, the cloud infrastructure is configured in accordance with the optimal configuration. As an example, if the profile indicates a workload with a large number of writes (or a high ratio of writes to reads), the infrastructure can be configured, perhaps by instructions from optimization module 124, to acknowledge the associated IO at the local cache included in host 110, where it can be optimized before transmitting it over the network 150. As another example, if the storage profile indicates low IOPS or highly sequential workloads, the storage array 130 can be configured, perhaps by instructions from optimization module 124, to provide mostly HDD (as opposed to SSD) storage. In contrast, if the storage profile indicates high IOPS or random workloads, the storage array can be configured, perhaps by instructions from optimization module 124, to provide HDD storage. In still yet another example, if the storage profile indicates a need for increased durability, the optimization module 124 may instruct the storage array to make and store two or three copies of the data associated with the storage request that the profile is associated with. Alternatively or additionally, erasure coding can be implemented (e.g., the data may be broken into fragments, expanded, encoded with redundant data pieces, and stored across various locations) when a storage profile indicates a need for increased durability.

In some instances, the optimal configuration may not be available and, thus, configuring the infrastructure in view of the optimal storage configuration may result in configuring the infrastructure as close to the optimal storage configuration as possible. However, in other instances, the optimal infrastructure may be available and the infrastructure may be reallocated, reorganized, and/or procured in the optimal configuration as determined at that time. For example, the precise number of volumes needed for the particular storage request may be procured and the network QoS may be configured as needed. Once the infrastructure is configured in view of the optimal storage configuration, data associated with the storage request is stored in the configured infrastructure at step 360.

Subsequent to initially storing the data associated with the storage request in the infrastructure at step 360, the workload associated with the storage request may be monitored in order to provide feedback that allows the configuration to be continually adjusted or refined in view of learned or changing attributes of the workload associated with the storage request. For example, in FIG. 3, the workload associated with the storage request is monitored at step 370 such that changes in the storage attributes of the workload and changes in the infrastructure can be detected, as illustrated by steps 380 and 385. If any changes are detected at steps 380 or 385, the storage profile may be updated at 390 and the infrastructure can be reconfigured in view of an optimal storage configuration determined for the updated storage profile from step 390. In some embodiments, the hypervisor 114 may perform the monitoring to determine if any storage attributes included in the profile (e.g., parameters or characteristics that would impact or otherwise affect how data associated with a storage request might be optimally stored) have changed. For example, as the workload executes, the hypervisor 114 may profile the workload to determine if the sequential vs. random ratio, reads vs. writes and the latency/service-time of the IO and provide two actions.

If the storage request anticipated a workload that does not match the actual/running workload, the infrastructure may be adjusted appropriately. Similarly, if or as underlying infrastructure changes, the optimization can be further refined in view of the new infrastructure resources. For example, if the network is upgraded from a 10 GB network to a 40 GB network, workloads that would be better optimized with larger network allocation may be adjusted appropriately (such as workloads that would optimally use a larger allocation but were not given such an allocation in view of available resources). Similarly, if a storage request was initially determined to require a 80/20 read/write ratio but used 100% writes over a period of time, the configuration may be adjusted in order to provide infrastructure that is more appropriate for a workload with 100% writes, such as by relocating data from SDD storage to HDD storage. In some embodiments, the hypervisor 114 may measure/meter the workload to determine optimal storage attributes for the workload, and continually compare the optimal storage attributes against the one or more storage attributes of the storage profile associated with the workload. Moreover, in some embodiments, the hypervisor 114 may work in concert with the array 130 and the network 150 in order to detect changes and adjust the infrastructure accordingly. Regardless of the particular infrastructure that performs the monitoring and implements the changes, as the number of workloads increase, the accuracy and depth of the set of profiles increase.

In addition to modifying the profile and/or infrastructure to optimize the storage configuration for data associated with a particular storage request, the infrastructure may also notify an application tenant of the VM that the IO profile that was requested does not match what is being detected. Thus, in some instances, an application tenant may chose to manually modify or adjust the storage request or profile. For example, a tenant may realize upon execution of a workload associated with a storage request that the workload resembles a webserver profile more than a database profile and adjust the storage request accordingly. In some embodiments, such an adjustment may not be necessary as the infrastructure may be automatically and dynamically reconfigured in view of detected changes. However, even in such embodiments, a manual change in the storage request may expedite the refinement of the storage profile. Regardless of manual adjustments to the requested storage profile, the infrastructure may relocate data between HDD storage and SDD storage, perform more or less aggressive read-aheads, modify the number of IOPS guaranteed by the volume on the array, modify the QoS of the network, and/or change the block size on the array to more efficiently store the data (e.g., large IO sizes should be stored on large block sizes within the array) in response to a profile being updated in view of a changed storage attribute or a change in the infrastructure.

In some situations, such as situations where a workload associated with a storage request is highly volatile, continual modification of the storage profile for a storage request for any detected change may be impractical. Consequently, when a highly volatile storage profile is detected, the profile may remain generalized in order to cover a wide range of possible storage attributes. However, regardless of how generalized the profile is, the profile may be continually refined in view of learned patterns or workload characteristics. For example, although a workload may be highly volatile over a number of days, the workload may be consistent from week to week and may be adjusted accordingly. Thus, as a workload runs, the storage profile associated with the workload may become more specific and accurate, such that the configuration is continually optimized over time. Continual optimization may minimize the amount of excess resources that are provisioned for workloads and essentially optimize the efficiency of the cloud resources. In fact, in some embodiments, monitoring is performed over a number of time windows and a storage profile (such as a predetermined storage profile) is further refined after each time window.

Similarly, in some situations, multiple storage requests may request the same resources. In order to ensure each storage request is adequately serviced, the storage array may have a Quality of Service (QoS) configured to guarantee a certain number of IOPS and the network may have a QoS configured to guarantee throughput. By comparison, concurrent data rights may be managed by the system via upper layer protocols, such as Network File System ("NFS") and Internet Small Computer System Interface ("ISCI").

Figure 4:
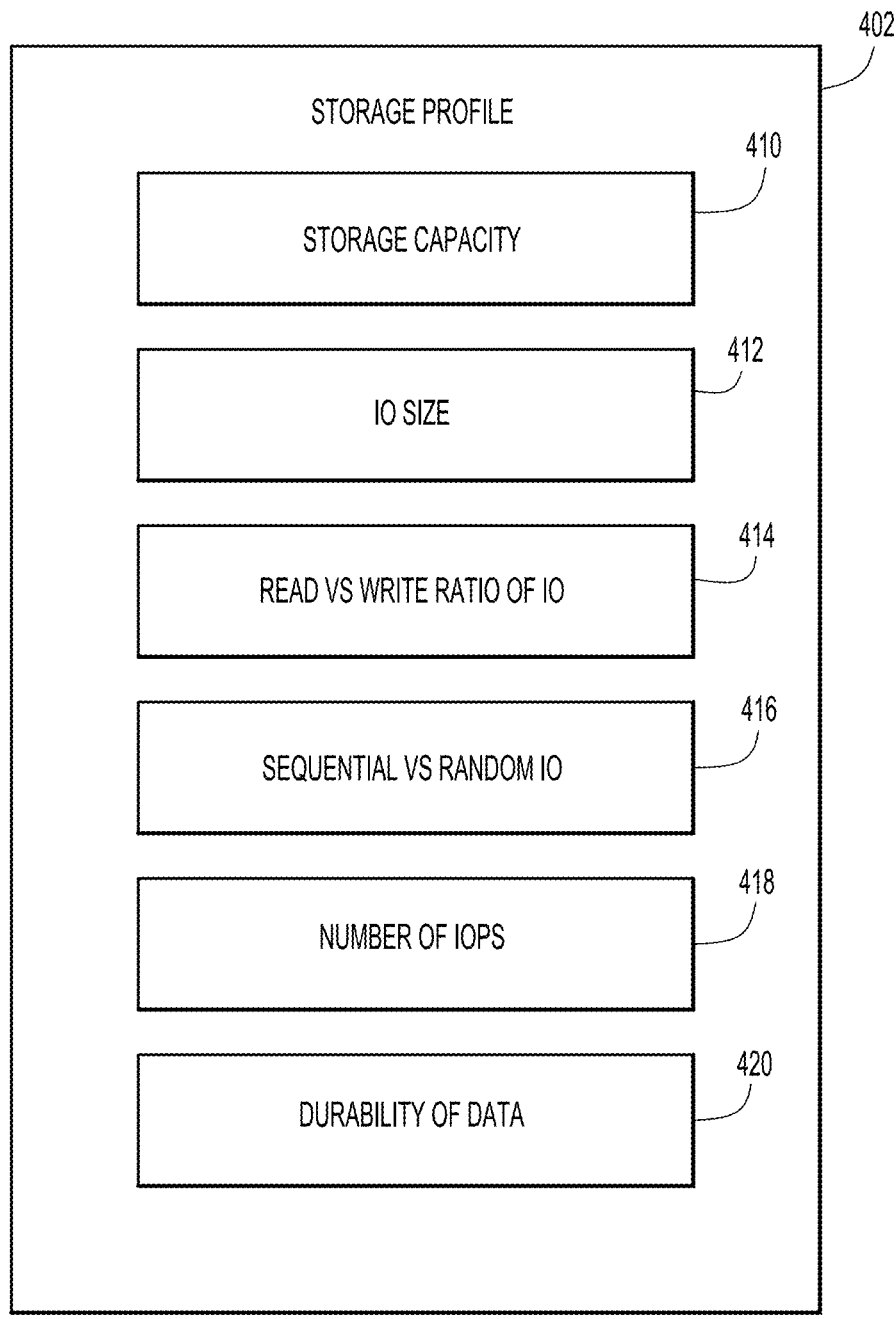
FIG. 4 is a diagram depicting an example profile based on one or more storage attributes, according to an example embodiment.

Reference is now made to FIG. 4, which illustrates a paradigm of an example profile 402. As mentioned above, in some embodiments, the profile may be based on various storage attributes of a workload, insofar as a storage attribute covers any parameter, property, or characteristic of a workload that may impact how the storage request associated with the workload should be stored in cloud infrastructure. In this specific example embodiment, storage profile 402 includes a storage capacity 410, an IO size 412, a read-write ratio 414, a sequential vs random IO ratio 416, a number of IOPS 418, and a durability of the data 420 as storage attributes.

The illustration in FIG. 4 represents one possible embodiment of storage attributes that may be included in a storage profile, however, it is to be understood that a storage profile could also include a subset of these storage attributes and/or additional storage attributes. In other words, a storage profile may include any desirable storage attributes. For example, the storage profile 402 may also include compression requirements, security parameters, and/or lifecycle parameters. The lifecycle parameters may define how long certain data should be kept (e.g., "time to live"), while the security parameters may define how certain data should be destroyed/disposed of and/or how data should be encrypted (e.g., should there be a key and, if so, who should own the key?).

There are several advantages to the techniques presented herein. First, the techniques presented herein enable cloud infrastructure to be optimized for a workload rather than requiring an application owner to try to assemble an optimal infrastructure from discrete cloud services. Second, the techniques described herein may be part of a Public Cloud and may intelligently program the network and adjust the infrastructure components if the requested workload does not match the running workload. Thus, even if an application owner is not sure or unaware of the characteristics that an IO stream will exhibit until after it goes into production at scale, which occurs frequently, the proper cloud infrastructure may be provided to the application owner. Moreover, as the underlying infrastructure changes, the optimization can be further refined.

To summarize, in one form, a method is provided comprising at a computing apparatus having connectivity to a network, receiving a storage request from a virtual machine associated with a tenant; analyzing the storage request to determine one or more storage attributes of the storage request; configuring an infrastructure in a configuration based on the one or more storage attributes; and storing data associated with the storage request in the infrastructure in accordance with the configuration.

In another form, a system comprising: a storage infrastructure subsystem including at least one storage array and non-volatile cache memory; a computer subsystem running one or more application associated with at least a first tenant, wherein the computer subsystem interfaces with the storage infrastructure subsystem and is configured to: receive a storage request from a virtual machine associated with the first tenant; analyze the storage request to determine one or more storage attributes of the storage request; configure an infrastructure in a configuration based on the one or more storage attributes; and store data associated with the storage request in the infrastructure in accordance with the configuration.

In yet another form, a non-transitory computer-readable storage media is provided encoded with software comprising computer executable instructions and when the software is executed operable to: receive a storage request from a virtual machine associated with a tenant; the storage request to determine one or more storage attributes of the storage request; configure an infrastructure in a configuration based on the one or more storage attributes; and store data associated with the storage request in the infrastructure in accordance with the configuration.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a computing apparatus having connectivity to a network, receiving a generic storage request from a virtual machine associated with a tenant;
analyzing parameters of the generic storage request to determine one or more storage attributes to add to any specific storage attributes explicitly included in the generic storage request;
configuring an infrastructure in a configuration based on the one or more storage attributes and the specific storage attributes; and
storing data associated with the generic storage request in the infrastructure in accordance with the configuration.

2. The method of claim 1, further comprising:
monitoring a workload associated with the generic storage request; and
adjusting the configuration based on one or more storage attributes of the workload.

3. The method of claim 2, wherein monitoring the workload associated with the generic storage request further comprises:
comparing the one or more storage attributes of the workload to the one or more storage attributes and the specific storage attributes on which the configuration is based; and
detecting a difference in the comparing.

4. The method of claim 1, further comprising:
monitoring the infrastructure for changes associated with data storage in the infrastructure; and
adjusting the configuration based on the changes.

5. The method of claim 1, further comprising:
selecting a predetermined storage profile based on the one or more storage attributes and the specific storage attributes; and
refining the predetermined storage profile based on the one or more storage attributes.

6. The method of claim 5, further comprising:
monitoring a workload associated with the generic storage request; and
further refining the predetermined storage profile based on one or more storage attributes of the workload.

7. The method of claim 6, wherein monitoring is performed over a number of time windows and the predetermined storage profile is further refined after each time window.

8. The method of claim 1, wherein the one or more storage attributes include at least one of: a volume size, an Input/Output (IO) size, a read/write ratio, a number of Input/Output Operations per Second (IOPS), or a durability.

9. A system comprising:
a storage infrastructure subsystem including at least one storage array and non-volatile cache memory; and
a computer subsystem running one or more applications associated with at least a first tenant, wherein the computer subsystem interfaces with the storage infrastructure subsystem and includes program instructions that cause the computer subsystem to:
receive a generic storage request from a virtual machine associated with the first tenant;
analyze parameters of the generic storage request to determine one or more storage attributes to add to any specific storage attributes explicitly included in the generic storage request;
configure an infrastructure in a configuration based on the one or more storage attributes and the specific storage attributes; and
store data associated with the generic storage request in the infrastructure in accordance with the configuration.

10. The system of claim 9, wherein the computer subsystem further includes program instructions that cause the computer subsystem to:
monitor a workload associated with the generic storage request; and
adjust the configuration based on one or more storage attributes of the workload.

11. The system of claim 10, wherein, in monitoring the workload associated with the generic storage request, the computer subsystem further includes program instructions that cause the computer subsystem to:
compare the one or more storage attributes of the workload to the one or more storage attributes and the specific storage attributes on which the configuration is based; and
detect a difference in the comparing.

12. The system of claim 9, wherein the computer subsystem further includes program instructions that cause the computer subsystem to:
monitor the infrastructure for changes associated with data storage in the infrastructure; and
adjust the configuration based on the changes.

13. The system of claim 9, wherein, the computer subsystem further includes program instructions that cause the computer subsystem to:
select a predetermined storage profile based on the one or more storage attributes and the specific storage attributes; and
refine the predetermined storage profile based on the one or more storage attributes.

14. The system of claim 13, wherein the computer subsystem further includes program instructions that cause the computer subsystem to:
monitor a workload associated with the generic storage request; and
further refine the predetermined storage profile based on one or more storage attributes of the workload.

15. A non-transitory computer-readable storage media encoded with software comprising computer executable instructions and when the software is executed operable to:
receive a generic storage request from a virtual machine associated with a tenant;
analyze parameters of the generic storage request to determine one or more storage attributes to add to any specific storage attributes explicitly included in the generic storage request;
configure an infrastructure in a configuration based on the one or more storage attributes and the specific storage attributes; and store data associated with the generic storage request in the infrastructure in accordance with the configuration.

16. The non-transitory computer-readable storage media of claim 15, further comprising instructions operable to:

monitor a workload associated with the generic storage request; and adjust the configuration based on one or more storage attributes of the workload.

17. The non-transitory computer-readable storage media of claim 16, wherein the instructions operable to monitor the workload associated with the generic storage request include instructions operable to:

compare the one or more storage attributes of the workload to the one or more storage attributes and the specific storage attributes on which the configuration is based; and detect a difference in the comparing.

18. The non-transitory computer-readable storage media of claim 15, further comprising instructions operable to:

monitor the infrastructure for changes associated with data storage in the infrastructure; and adjust the configuration based on the changes.

19. The non-transitory computer-readable storage media of claim 15, further comprising instructions operable to:

select a predetermined storage profile based on the one or more storage attributes and the specific storage attributes; and refine the predetermined storage profile based on the one or more storage attributes.

20. The non-transitory computer-readable storage media of claim 19, further comprising instructions operable to:

monitor a workload associated with the generic storage request; and further refine the predetermined storage profile based on one or more storage attributes of the workload.

* * * * *